United States Patent
Liu et al.

(10) Patent No.: US 7,296,256 B2
(45) Date of Patent: Nov. 13, 2007

(54) METHOD AND APPARATUS FOR AUTOMATIC MODELING BUILDING USING INFERENCE FOR IT SYSTEMS

(75) Inventors: Zhen Liu, Tarrytown, NY (US); Petar Momcilovic, New York, NY (US); Honghui Xia, Croton-on-Hudson, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/689,807

(22) Filed: Oct. 20, 2003

(65) Prior Publication Data

US 2005/0086335 A1 Apr. 21, 2005

(51) Int. Cl.
*G06F 9/44* (2006.01)
*G06F 9/45* (2006.01)

(52) U.S. Cl. .................. 717/104; 717/149; 717/154

(58) Field of Classification Search ........ 717/101–106, 717/120, 127, 143–144, 148–149, 154–155; 709/203
See application file for complete search history.

(56) References Cited

U.S. PATENT DOCUMENTS

| | | | | |
|---|---|---|---|---|
| 5,535,393 A * | 7/1996 | Reeve et al. | ................ | 717/149 |
| 5,768,594 A * | 6/1998 | Blelloch et al. | ............. | 717/149 |
| 5,881,268 A * | 3/1999 | McDonald et al. | ............ | 703/21 |
| 6,088,718 A * | 7/2000 | Altschuler et al. | .......... | 709/203 |
| 6,106,575 A * | 8/2000 | Hardwick | ................... | 717/119 |
| 6,260,186 B1 * | 7/2001 | James | ......................... | 717/104 |
| 6,339,840 B1 * | 1/2002 | Kothari et al. | .............. | 717/149 |
| 6,536,037 B1 * | 3/2003 | Guheen et al. | ............. | 717/151 |
| 6,691,067 B1 * | 2/2004 | Ding et al. | ................. | 702/186 |
| 6,738,955 B2 * | 5/2004 | Andersen et al. | .............. | 716/4 |
| 6,904,449 B1 * | 6/2005 | Quinones | .................... | 709/203 |
| 6,912,550 B2 * | 6/2005 | Zhang et al. | ............... | 707/200 |
| 6,938,240 B2 * | 8/2005 | Charisius et al. | ........... | 717/104 |
| 6,973,415 B1 * | 12/2005 | Saghier et al. | .............. | 702/186 |
| 7,039,897 B2 * | 5/2006 | Anderson et al. | ........... | 717/104 |
| 7,047,518 B2 * | 5/2006 | Little et al. | ................. | 717/108 |
| 7,062,756 B2 * | 6/2006 | Kamen et al. | .............. | 717/127 |
| 7,069,537 B2 * | 6/2006 | Lazarov | ..................... | 717/104 |
| 7,073,164 B1 * | 7/2006 | Knowles | ..................... | 717/102 |
| 7,134,075 B2 * | 11/2006 | Hind et al. | ................. | 715/513 |

OTHER PUBLICATIONS

Palugyai et al, "Performance modeling of rule based architectures as discrete time quasi birth death processes", IEEE Lan Man, pp.1-6, 2005.*

(Continued)

*Primary Examiner*—Anil Khatri
(74) *Attorney, Agent, or Firm*—F. Chau & Associates, LLC

(57) ABSTRACT

Method for modeling the performance of an Information Technology system are disclosed. The method includes the steps of receiving performance data of the system; receiving data of transaction flows and system topology; and inferring service demand parameters based on the received data. If closed form expressions are available to characterize the system, an optimization algorithm based on minimum distance between predicted and measured response times and may be used to obtain the performance parameters. Alternatively, a discrete event simulator together with a set of meta-heuristic search methods may be applied to obtain the optimized performance parameters.

22 Claims, 6 Drawing Sheets

OTHER PUBLICATIONS

Wagner et al, "Performance models for the processor farm paradgim", IEEE Trans on Parallel and Distributed Systems, vol. 8, No. 5, pp. 475-489, 1997.*

Rajabzadeh et al, "Performance modeling of fully adaptive wormhole routing in n-dimensional mesh connected multicomputres" iEEE, pp. 199-206, 2006.*

Bondarev et al, "CARAT: a toolkit for design and performance analysis of component based embadded systems", ACM, pp. 1024-1029, 2007.*

Kerbyson et al, "Predictive performance and scalability modeling of a large scale application", ACM SC pp. 1-12, 2001.*

Lee et al, "Methods of inference and learning for performance modeling of parallel applications", AC< PPoPP, pp. 249-258, 2007.*

Yang, "An approach to modeling performance evaluation on the ethernet with QoS parameters", International Journal of Network Management, 11:91-101, 2001.*

Ahmad et al, "Performance predication of distributed load balancing on multicomputer systems", ACM pp. 830-839, 1991.*

* cited by examiner

METHOD AND APPARATUS FOR AUTOMATIC MODELING BUILDING USING INFERENCE FOR IT SYSTEMS

BACKGROUND OF THE INVENTION

1. Field of the Invention

The present invention generally relates to the performance modeling of information technology ("IT") systems. More specifically, the present invention relates to the integration of queuing network modeling and inference techniques to model the performance of IT systems.

2. Description of the Related Art

With the rapid advances in Internet technology, electronic commerce ("e-commerce") is becoming a mature business strategy. The concept of Quality of Service ("QoS") is working its way to the front-line of e-business commitments and requirements, as it plays an important role in Internet applications, services, and price negotiations. In the growing competitive marketplace, IT administrators and planners are under constant pressure to have definitive answers for the following questions: How many users can the IT system support with the current infrastructure? What level of service quality is being delivered for each service? How fast can the site architecture be scaled up or down? What components should be upgraded? Is there enough capacity available to support the expected business opportunities and future growth? To solve these problems, e-businesses urgently need a formal process for planning and budgeting, for performance prediction, and for service-level agreement provisioning. Such a process would require a fundamental understanding of key issues such as capacity, scalability, availability, and reliability of an e-business infrastructure.

The characterization of an e-business infrastructure is quite complex, given the variety of system architectures, numerous emerging applications with different functions, and the vast diversity in user behaviors. Therefore, it is a challenging task to assess the e-business' capability of delivering end-to-end performance assurance across the entire IT environment, inclusive of all IT infrastructure components and applications. A commonly used approach to assess e-business performance is to directly measure the performance of the IT environment, either in the production system, i.e., the work environment, using real workloads, or on a test system using synthetic workloads. Measuring performance directly on the production system is risky since it requires exposing users to poor performance, which could drive away customers. On the other hand, having a testing site is a very expensive practice. The efforts would be enormous to simply duplicate the production system and certify the proper functioning of all the interconnected software and hardware components. In addition, since the workload space is continuous, it would be an insurmountably difficult task to test across all different load combinations.

An alternative approach to assess the performance of an IT system is through performance modeling. Performance modeling has become increasingly important in the design, engineering and optimization of IT infrastructures and applications. A modeling approach is particularly efficient in providing architects and engineers with qualitative and quantitative insights about the IT system under consideration. Despite its advantages, the modeling work is time consuming and requires good knowledge not only of the system, but also of modeling techniques.

One of the most popular paradigm of performance modeling is queuing networks, which resolves the problems discussed above. The primary advantage of a queuing model is that it captures the fundamental relationship between performance and capacity. The idea of using queuing networks to model computer systems in general, and Web systems in particular has been suggested (See L. Kleinrock; *Queueing Systems Volume II. Computer Applications*; John Wiley and Sons, 1976; and D. Menasce and V. Almeida; *Capacity Planning for Web Performance*; Prentice hall, 1998). That idea is based on building analytical models by representing each device in the IT system as a queue. Nevertheless, such approach requires knowledge of the service demands of each type of request for each device in the IT system. In real systems, such service demands can be very difficult to measure since they do not include the queuing delay that might occur. This not only requires knowledge of all the devices, but it also involves the collection of a massive amount of data to determine the service demands of each type of request at each device, given the large number of devices and diversity of request types. Practically one cannot afford to build such a detailed low-level queuing network model.

In light of the foregoing, there is a need in the art for systems and methods aimed at automating the process of performance modeling and optimization of IT infrastructure and applications so as to reduce both the equipment and labor costs, and shorten the turn-around time in performance assessment, prediction and capacity planning. Those systems and methods should enable IT managers to quantify, control and plan, efficiently and proactively, the utilization of the available capacity in e-business infrastructures.

SUMMARY OF THE INVENTION

In view of the foregoing problems, drawbacks, and disadvantages of the conventional systems, it is an exemplary feature of the present invention to combine inference techniques with queuing models to automate the process of performance modeling and optimization of IT systems and applications.

The method of the present invention uses high-level queuing network models to capture major resource and delay effects, which provides good tractability between the performance measures and the IT system architecture.

The method of the present invention only requires as input the most common and inexpensive measurements. Such measurements include, for example, the system throughput, utilization of the servers, and end-to-end response times.

Taking the above measurement data as input, the method of present invention uses advanced inference techniques to obtain the parameters of the performance model for the IT system. The service demands may be inferred, for example, for each server and each transaction in the IT system.

In one embodiment of the invention, the IT system may be characterized with the use of closed-form equations. In that embodiment, the inference method includes the steps of deriving the end-to-end response time formulas based on the closed-form equations; formulating the inference (parameter estimation) problem based on the performance metrics that are available; inputting the end-to-end response times for transactions and the server utilization data into the inference problem formulation; solving the inference problem for the model parameters (service demand per transaction per server) so that the distance from the performance metrics produced by the model to the measured is minimized.

Another embodiment of the present invention addresses the situation where closed form expressions are not available. In that situation, a discrete event simulator together with a set of meta-heuristic search methods may be used to obtain the optimized performance parameters. The meta-heuristic search methods will guide the search to generate a next candidate parameter setting. The simulator for the model will be used to evaluate the performance metrics for the candidate parameter setting. The meta-heuristic search methods will be used again to generate a next candidate parameter setting based on the performance metrics for the current and past candidate settings. This procedure repeats until a given stopping criterion is satisfied. The output of the procedure is the current best estimate of the parameter setting.

These and other features and advantages of the present invention will be described in, or will become apparent to those of ordinary skill in the art in view of, the following detailed description of the preferred embodiments.

BRIEF DESCRIPTION OF THE DRAWINGS

The foregoing and other exemplary features, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
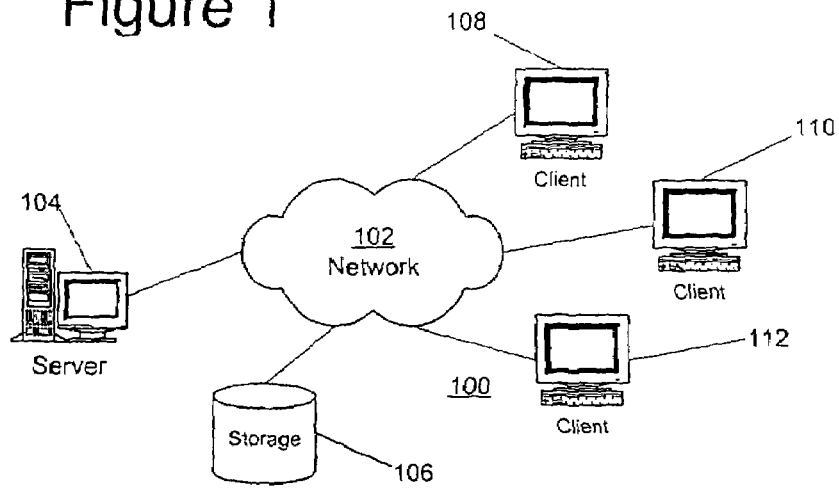
FIG. 1 depicts a pictorial representation of a network of data processing systems in which the present invention may be implemented.

Referring now to the drawings, a preferred embodiment of the present invention will now be described. A person of ordinary skill in the art will understand that the invention is not limited in any manner by the disclosed embodiments or the drawings used in this application to describe the same.

The present invention provides a method and apparatus for the automatic parameterization of performance models arising from IT infrastructure and applications. One novel idea in the proposed methodology is the integration of queuing network models and advanced inference techniques. This approach uses system measurement data and end-to-end response time measurement data as input to infer the queuing parameters of the system.

The present invention offers a number of attractive features and advantages compared to the conventional approaches. First, it utilizes the strength of the queuing network model, which helps to capture the fundamental relationship between performance and capacity. Second, by relying on the inference techniques based in observing utilization and end-to-end performance data, the method of the present invention sidesteps the problems of the traditional queuing network modeling work, which requires massive low-level system monitoring and data collection. Since the system of the present invention receives end-to-end data measurements, the process of model building becomes automatic. The model building approach of the present invention allows, in particular, building performance models in a fast and accurate fashion, especially for complicated systems. Use of the present invention results in significant time saving compared to the conventional performance modeling approaches based on manual parameter tuning. It also allows the building of performance models on the fly based on the system monitoring information. Such a feature is particularly useful for dynamic provisioning in on-demand systems.

The present invention therefore provides an end-to-end, self-tuning, and flexible method that allows the building of performance models on-the-fly based on the system monitoring information. It can easily be incorporated into a suite of performance engineering functions, ranging from performance prediction, to optimization of existing IT infrastructure, and design of cost-effective architectures. All of the functions may provide insights of the capabilities of a Web site, as well as a better understanding of the trade-offs between scalability, QoS, capacity cost, operations risk, etc. The present invention would therefore enable IT planners to aggressively develop and provide solutions that increase customers' infrastructure, application and service management capabilities, and to help customers to proactively manage their resources and meet their service level agreements on-demand.

The present invention may further use high-level queuing network models to capture major resource and delay effects and provide good traceability between the performance measures and the system architecture. A general inference methodology, described below, allows one to infer the aforementioned service time parameters by using common measurements such as system throughput, server utilization, and end-to-end response times. There have been studies in the networking and queuing literature (See S. Alouf, P. Nain and D. Towsley. Inferring network characteristics via moment-based estimators. *Proceedings of the IEEE Infocom 2001 Conference*, April 2001; V. Sharma, R. Mazumdar. Estimating traffic parameters in queueing systems with local information. *Performance Evaluation*, 32:217-230, 1998) on related inference problems, mostly on a single bottleneck queue and under the first-come-first-served service discipline. In one embodiment, the inference problem solved by the present invention differs because the input and output data are reversed.

Model Building

The preferred embodiments of the present invention are implemented in a distributed data processing environment in which end-to-end response time and CPU utilization measurements are compiled and used for the automatic model building. Since the present invention is implemented in a distributed data processing environment, a brief description of this environment will first be provided in order to provide a context in which the present invention operates.

With reference now to the figures, FIG. 1 illustrates a network data processing system 100, which is a network of computers in which the present invention may be implemented. The method of the present invention may be carried out for the entire environment. A computer program for carrying out the invention may be installed in any of the servers or computers illustrated in the system 100. Alternatively, and external administration server or computer (not illustrated in the Figure) may also implement the method of the present invention.

In FIG. 1, network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
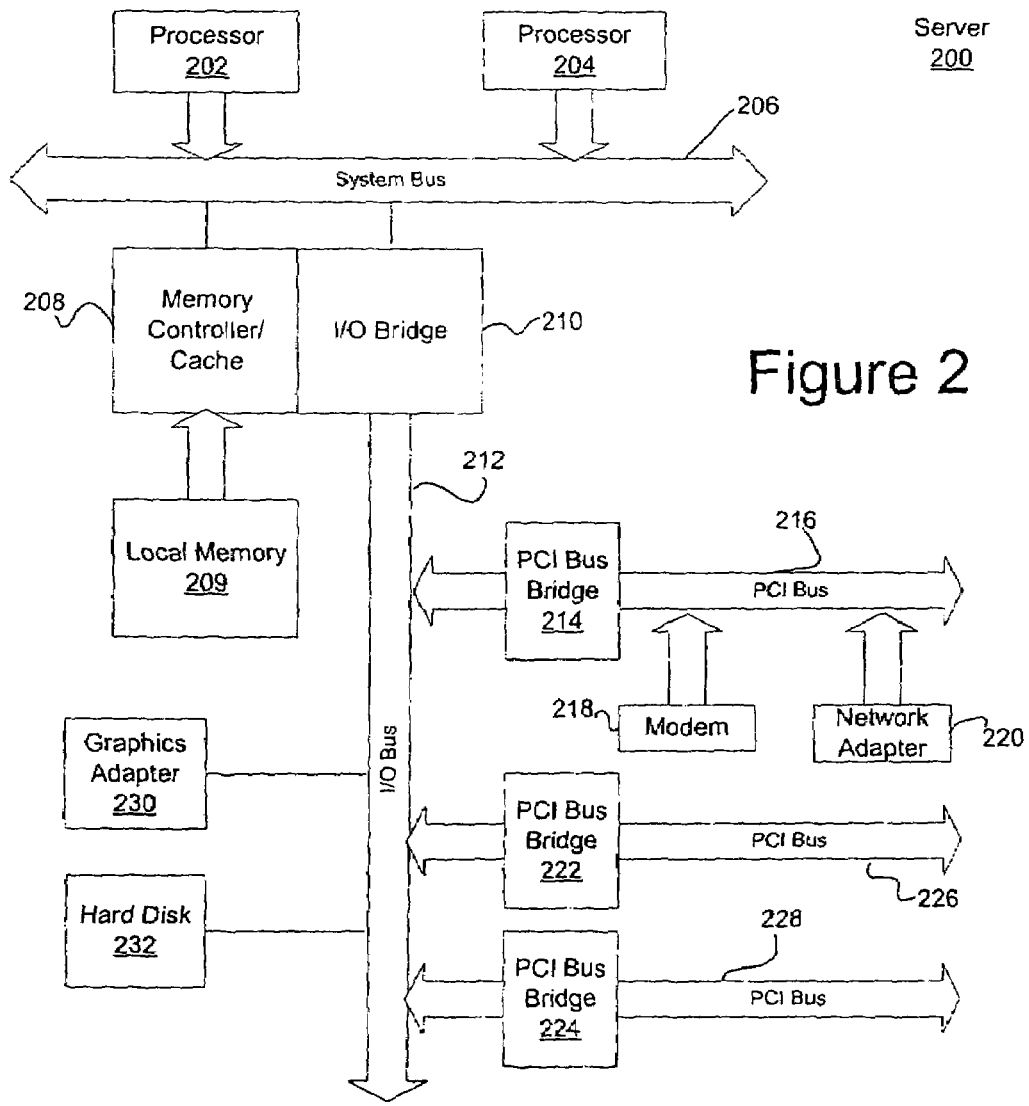
FIG. 2 is a block diagram of a data processing system that may be implemented as a server in accordance with one embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
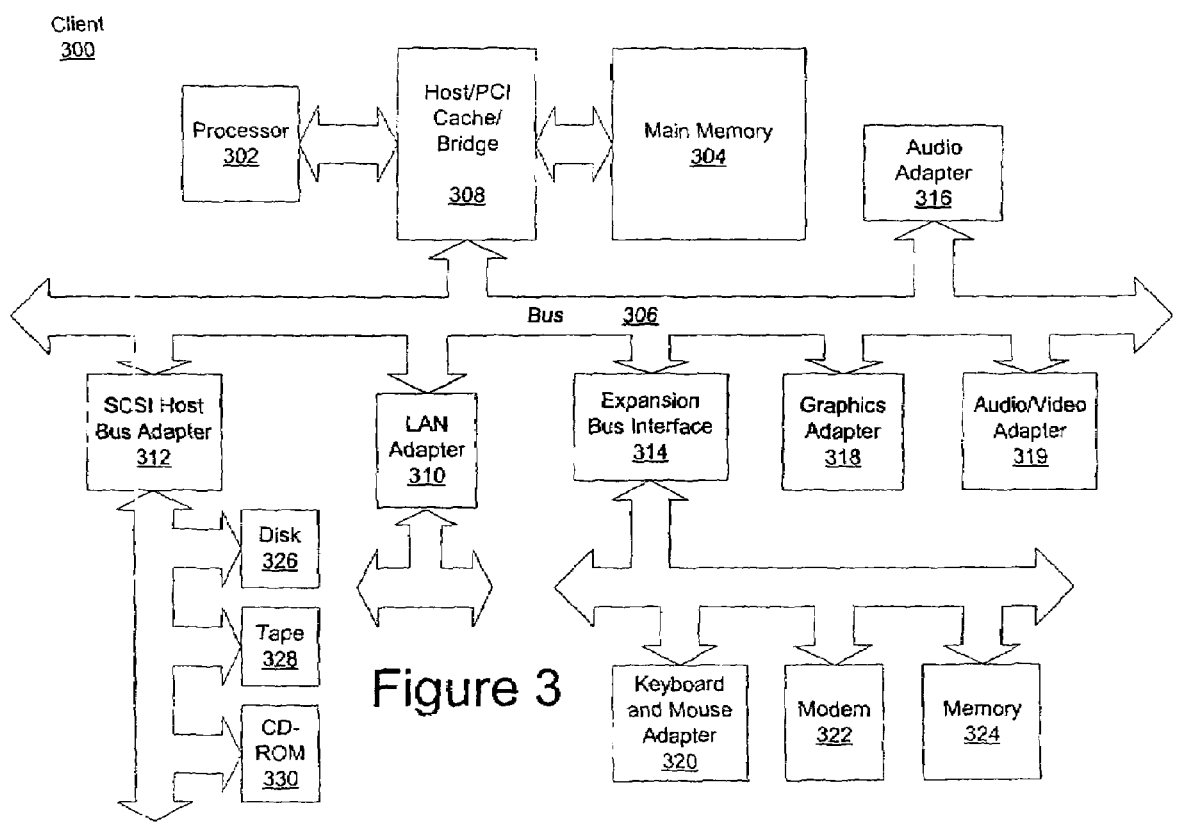
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The model building method of the present invention is based on the use of queuing network models to capture the e-business service process at high-level. A single server queue alone may not be adequate for complex e-business infrastructures that perform a variety of functions (e.g., browse, search and buy transactions). Some portions of the service are provided in parallel, e.g., the serving of requests for embedded images; while other portions of the service are provided in series, e.g., the serving of database transactions. This complicated service structure requires a more complex model than the generic single server queue.

Figure 4:
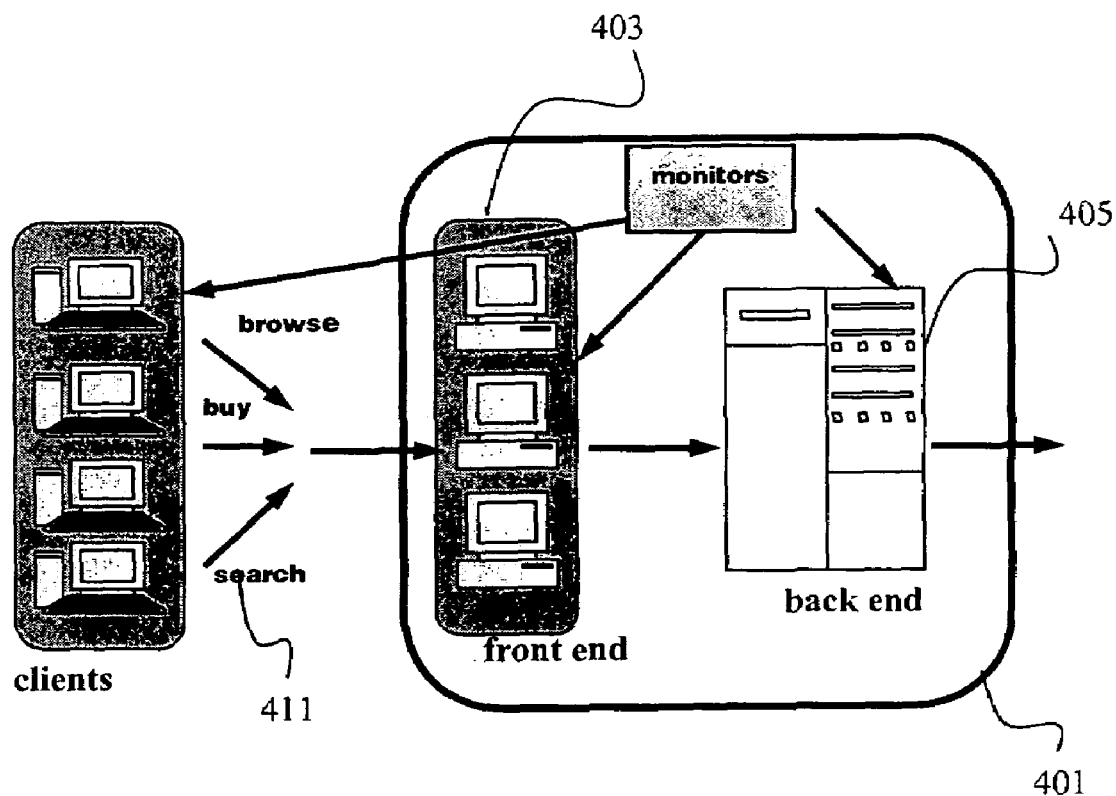
FIG. 4 illustrates an exemplary e-business site and its corresponding queuing model.

FIG. 4 illustrates an example of a typical e-business service structure 401. Such e-business infrastructures often have multiple layers of machines, or tiers. Each tier may handle a particular set of functions (e.g., browse, search and buy transactions 411 ). There are two tiers in FIG. 4, for example. The first tier illustrated includes a cluster of machines 403 and is referred to as the front-end; the second illustrated tier includes a single database server 405 and is referred to as the back-end. The front-end Web servers 403 handle the serving of requests for static pages. In addition, the front-end servers 403 handle many pages that change over time, each requiring the server to execute a script to compose the page before sending it to clients. These pages are called dynamic pages, some of which involve obtaining, or updating, information from the database server. The back-end database server(s) 405 handles database transactions. While FIG. 4 provides a generic diagram of an e-business infrastructure, the method of the present invention can be extended to accommodate a wide range of related infrastructures.

The present invention makes use of a high-level multi-class queuing network model. This form of model captures major resource and delay effects and provides good traceability between the performance measures and the system architecture. Different transactions may be treated as different classes of jobs since the transaction would make different resource demands on different components. Each resource component that incurs non-negligible delays may be modeled as a "black box." A black box may be defined as a component that does not specify detailed service time information.

Figure 5:
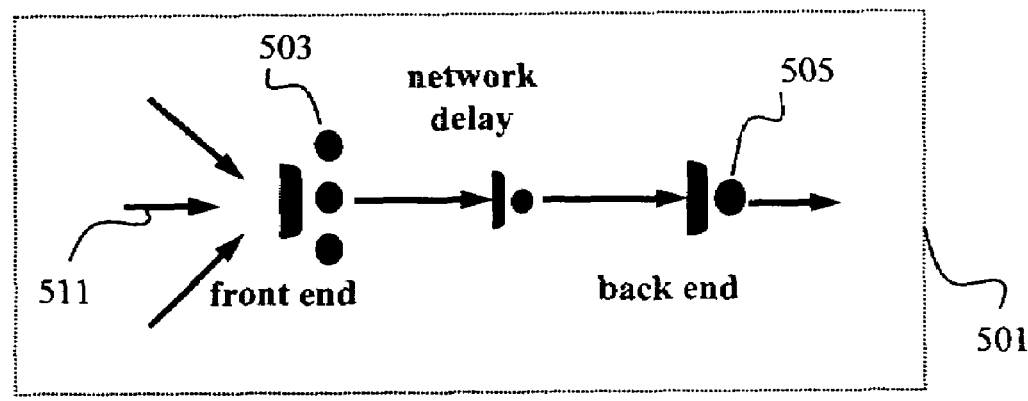
FIG. 5 illustrates an exemplary queuing model corresponding to the e-business site depicted in FIG. 4.

Based on the modeling method described above, the two-tier e-business architecture 401 can then be captured by a high-level queuing network model 501 as depicted in FIG. 5. Each front-end server 403 is modeled as a generic server 503; similarly, the back-end database server 405 is modeled as a generic server 505. The various types of user transactions 411 (browse, buy, search, etc.) are considered as different job classes 511. Since most modern computer systems are running under the time-shared mode, so as to allow a population of users to share equally for the use of the resources, it is assumed that all generic servers are serving multiple classes of jobs according to the processor sharing discipline. A processor sharing discipline may be defined as an approximation to time-sharing in which the quantum length tends to zero. Hence, if there are n jobs in the system, they each simultaneously receive 1/n of the resource. In fact, depending on whether the multiple job classes are processed sequentially or in parallel, different service disciplines may be needed at different boxes.

One of the initial steps in building the performance model in accordance with an embodiment of the present invention is obtaining the parameters of the service demands for each class at each generic server in the queuing network model.

Ideally, obtaining these parameter values involves directly measuring the resource consumption of each class at each device, which is a very costly practice. A solution is to rely on performance metrics that are measurable and relatively inexpensive, such as the end-to-end response times, and the CPU load information of some or all servers. End-to-end response time, which may be defined as the time from initiation of a request from the user, until the time that the user receives a response, can be measured easily. In fact, companies often set specific targets for these end-to-end delays so as to guarantee a satisfactory user experience. CPU load information is another metric used for Web service performance monitoring.

The present invention may utilize a general inference methodology to infer these service time parameters using the most common measurements such as the system throughput, utilization of the servers, and end-to-end response times. Due to the stochastic nature of the IT system, it is hard to pin-point which measurement set is the best. Thus a set of inferred parameters may be defined as "optimal" if the resulting performance of the IT system model is "closest" to the measured performance. The distance between two different performance metrics can be general, e.g., the weighted average across different components or classes.

The inference methodology applied in the present invention may include two aspects. If the underlying queuing network model has closed-form performance expressions (or good analytic approximations), then its performance can be formulated as a function of the unknown service demand parameters and a solver or other optimization tool may be used to obtain the optimal parameter settings. The above model building process is depicted as module 603 in FIG. 6, which shows an implementation of the present invention.

An example will next be described for a system having I servers, J different transaction types in the underlying queuing network model, and where service times for transaction j at server i denoted by Sij, are unknown. The arrival rate λj of transaction j; and Rj, the end-to-end response time for transaction j, for j=1, . . . , J, are actually measured. Further, the utilization at server i may be denoted by $\rho_i$, for i=1, . . . , I.

For the exemplary system in an open queuing network environment, closed-form response time (Rj) expressions (i.e., Equations 615 in FIG. 6) under processor-sharing service disciplines include:

$$\rho_i = \sum_{j=1}^{J} \lambda_j S_{ij}$$

$$R_{ij} = \frac{S_{ij}}{1 - \rho_i}$$

$$R_j = \sum_{i=1}^{I} R_{ij} = \sum_{i=1}^{I} \frac{S_{ij}}{1 - \rho_i}$$

To derive the closed-form expressions (i.e., Equations 615) for end-to-end response times in a closed queuing network environment, the mean-value analysis (MVA) algorithm (refer to, e.g. M, Reiser and S. S. Lavenberg, Mean-value analysis of closed multi-chain queueing networks, *J. ACM*, vol. 27, p. 313-322, 1980), may be used to compute the average delay of the system recursively from the m concurrent users to m+1 concurrent users.

Based on above response time formulae, statistical inference techniques may be applied to search for the optimal set of parameters so that the resulting performance is the closest to the measured performance, where the distance between two different performance metrics can be general, e.g., the weighted average across different components or classes.

For example, for the open queuing network inference problem, based on the previous closed-form expressions for the end-to-end response times for all job classes, we then have the following generic optimization formulation (i.e., Equations 615) for the model building:

Min DistanceMetric (MeasuredResponseTime, PredictedResponseTime)
$\min_S$ distance metric $(R_j^m, R_j^e)$
constraint to $$R_j^e = \sum_{i=1}^{I} \frac{S_{ij}}{1 - \rho_i^m}, \forall j$$

$$\rho_i^m - \sum_{j=1}^{J} \lambda_j S_{ij} \leq \varepsilon_i, \forall i$$

$$\rho_i^m - \sum_{j=1}^{J} \lambda_j S_{ij} \geq -\varepsilon_i, \forall i$$

$$S_{ij} \geq 0, \forall i, j$$

There are several values of $S_{ij}$ that will satisfy the equations above. To optimize the solution, the value of $S_{ij}$ that minimizes the distance between the measured end-to-end response time $R_j^m$ and the predicted/computed end-to-end response time $R_j^e$ is selected.

In the case of closed queuing network models, the inference problem can be formulated similarly, where a different set of constraints corresponding to the MVA algorithm for closed queuing networks will apply.

On the other hand, if closed-form expressions or analytic approximations are not available, the present invention may rely on discrete-event simulator 611 together with a set of meta-heuristic search methods 613 including various tabu search and/or simulated annealing algorithms to search for the optimal set of parameters. More details on these algorithms can be found in F. Glover and M. Laguna. *Tabu Search*, Kluwer, Boston, 1997; D. S. Johnson, C. R. Aragon, L. A. McGeoch, and C. Schevon. Optimization by simulated annealing: an experimental evaluation. *Operations Research*, vol. 37, p. 865-892, 1989.

Figure 6:
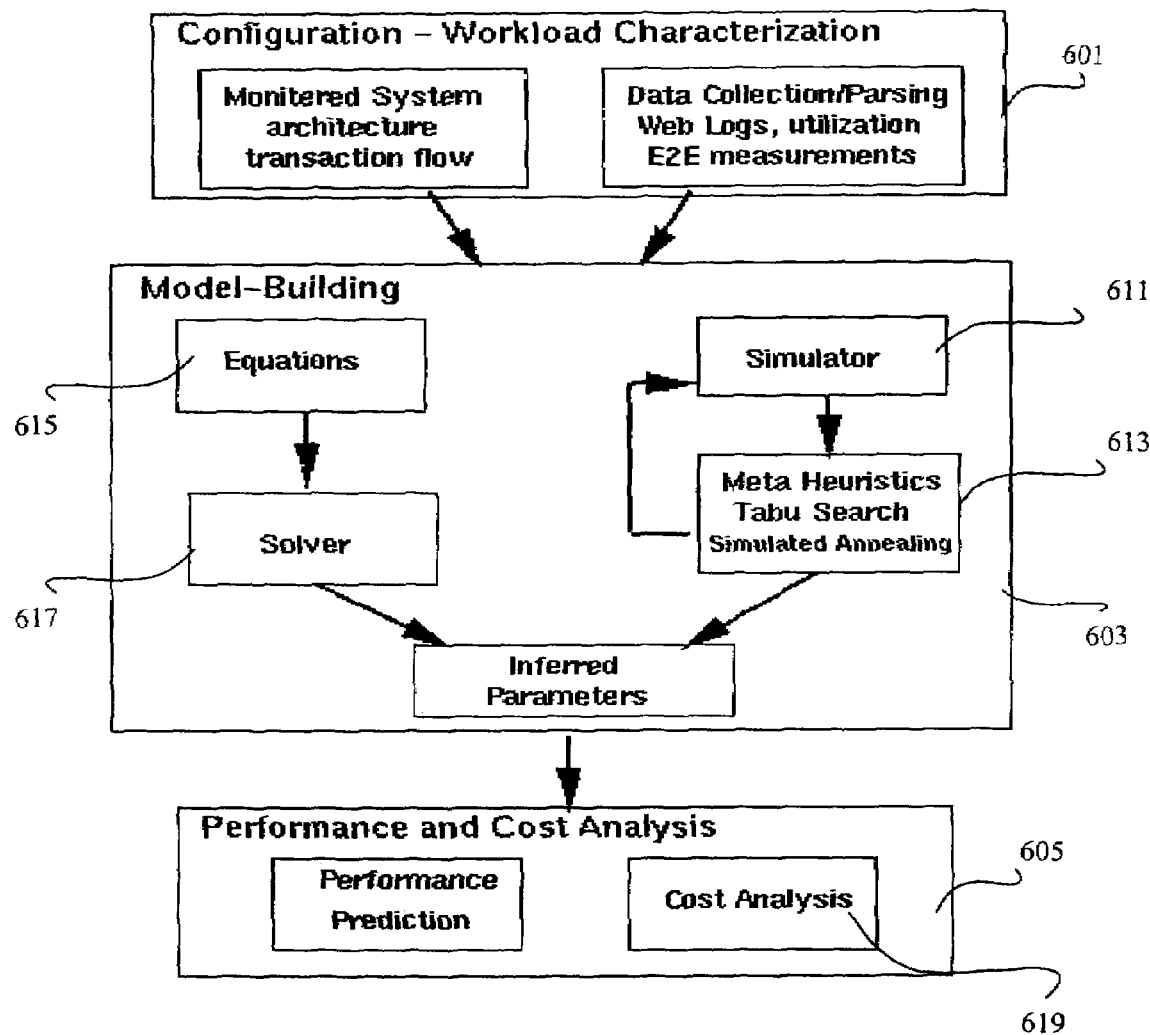
FIG. 6 illustrates a block diagram of the methodology for one embodiment of the present invention.

FIG. 6 shows one implementation of the methodology 600 of the present invention. The methodology 600 includes three key modules 601, 603, and 605. Each module performs different methods that make the automation of the modeling process possible. In general, module 601 may perform system configuration and/or workload characterization functions; module 603 may perform model-building functions (a key aspect of the present invention); and module 605 may perform cost analysis and performance prediction functions. Each module may be a software module or set of algorithms that can be executed by a computer to create, for example, the model illustrated in FIG. 8.

As illustrated in FIG. 6, module 601 may perform two initial steps: (i) understand the system architecture and transaction flow; and (ii) characterize the peak workload.

In the embodiment illustrated in FIG. 6, module 601 applies the basic knowledge of the system architecture and transaction flow. Module 601 also incorporates a parsing and profiling engine 601 that characterizes workload automatically by analyzing server logs. The logs contain the event records of all HTTP requests entering the server. The module 601 processes the raw logs to obtain this information and clusters the HTTP requests into groups according to their behavior. Requests in different clusters may differ in terms of request types (e.g., static v.s. dynamic); rate at which transactions are taking place, and the times required to process the requests, etc.

Module 603 then maps the system architecture into a network of generic servers. The different clusters of requests (resulted from profiling) are mapped into different job classes traversing the queuing network based on the transaction flow, with each class having different arrival rate and different service demands at different servers. Since the service demands of these classes at each server are unknown, the system of the present invention has to learn about these unknowns by training the available dataset, which includes common and inexpensive measurements such as the system throughput, utilization of the servers, and end-to-end response times. Module 603 makes use of the queuing equations and the optimization formulation 615, and relies on solver 617 to infer the unknown service demand parameters. One may use part of the dataset to train the model and the remaining dataset to validate the model. In fact, the above learning procedure can be repeated and the model can be refined as more measurements become available. When the validation results are satisfactory and stable, a performance model is then fully developed. Thus, to obtain a valid performance model is simply to obtain the optimized inferred parameters.

Once a valid performance model has been established, the above closed-form expressions or the recursive mean-value analysis algorithm can be used to predict performance, optimize existing IT infrastructure, and to suggest cost-effective architecture design through deployment and operations. Those functions may be implemented in module 605 in FIG. 6.

As an example, to predict the performance under a different workload, (say the predicted load with expected future business growth), the input load may be plugged into an analytical queuing formula (Equations 615) or may be fed into the simulator 611. The output of Equations 615 or simulator 611 then shows the expected delay and resource utilization under the predicted load. Based on the output performance metrics and resource utilization metrics, the system of the present invention may determine the level of service quality that can be delivered for each service with the current infrastructure, the location of the bottleneck of the system, etc.

Similarly, the inferred model from module 603 can be used to understand the scalability and analyze a series of what-if scenarios. For example, to answer the question 'what if the front-end server capacity is doubled?', one simply needs to modify the queuing formulas 615 accordingly, or adjust the corresponding server speed in simulator 617, the output of equation 615 or simulator 617 will immediately provide the answer.

In today's e-business environment, it is important for IT planners to associate economic factors with capacity. Module 605 can further provide cost analysis functions 613 that quantify cost-performance trade-offs. From the total cost of providing the e-business infrastructure and the capacity utilization, the cost per transaction, cost of each service, and the cost to support each customer can be computed.

Implementation

Figure 7:
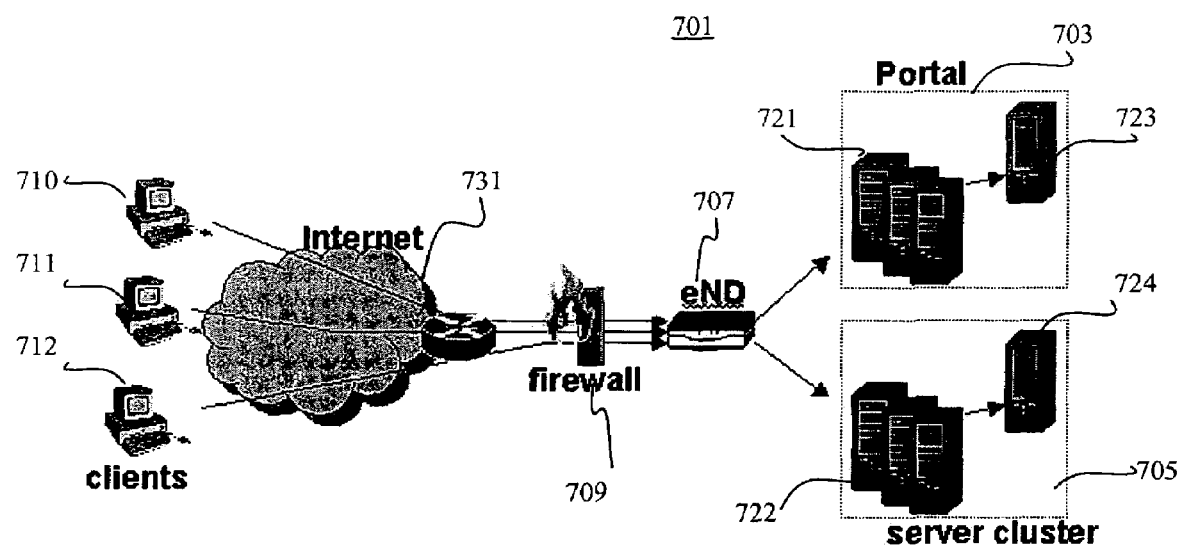
FIG. 7 illustrates an exemplary e-business site architecture.

This section presents a case study using the present invention based on the testing of an unnamed commercial Web site. The present invention may be used for modeling a testing environment for a commercial Web site. Referring to FIG. 7, a copy of the Web site 701 may be set up in an isolated testing environment. The test site is said to be isolated because it is typically a dedicated environment in a lab with synthetic load, which is separate from the production environment. The site 701 contains two separate clusters of servers. The portal cluster 703 is primarily responsible for authentication-related requests. Business related requests are processed separately by the cluster of business transaction servers 705. Within each cluster, there are two tiers, front-end servers 721-722, and back-end database servers 723-724. Incoming requests to the site are routed to a collection of front-end servers by a load balancing router, such as IBM's enterprise network dispatcher (eND) 707 (refer to, e.g. G. Hunt, G. Goldszmidt, R. King, and R. Mukherjee. Network dispatcher: A connection router for scalable Internet services. *Proceedings of the 7th International World Wide Web Conference*, April, 1998), or similar products from other vendors. The eND 707 routes requests in a weighted round robin fashion, so as to evenly distribute the load to the front-end servers 721-722. The processed pages are usually returned directly to the clients without going back through the eND 707.

Scripts may be used to generate several classes of transactions in certain proportions, which can be easily customized. A number of load drivers (mimicking clients 710-712 all over the world) may be set up running these scripts so as to drive the load consistently at a desired level. The clients 710-712 will be replaced by a number of load drivers, each generates synthetic traffic. Thus the scripts may be running on these load driver machines. The system is said to have a load of m user sessions if the total number of concurrent users in the system is m. This may be realized by initiating m user sessions (usually the starting times are somewhat spread out) by the load drivers. Each session follows a sequence of page requests pre-specified in the script. Once all requests in the sequence are executed, the user enters a sleep mode for a given amount of time (think time) and then starts a new cycle to execute the script again.

After the throughput of the front-end 721-722 and back-end servers 723-724 is measured, the Web load drivers collect the per-class response time statistics of the servers 303, 305, including their mean and variance. Aggregate utilization measures may be obtained from a different set of tools on both sets of servers.

Figure 8:
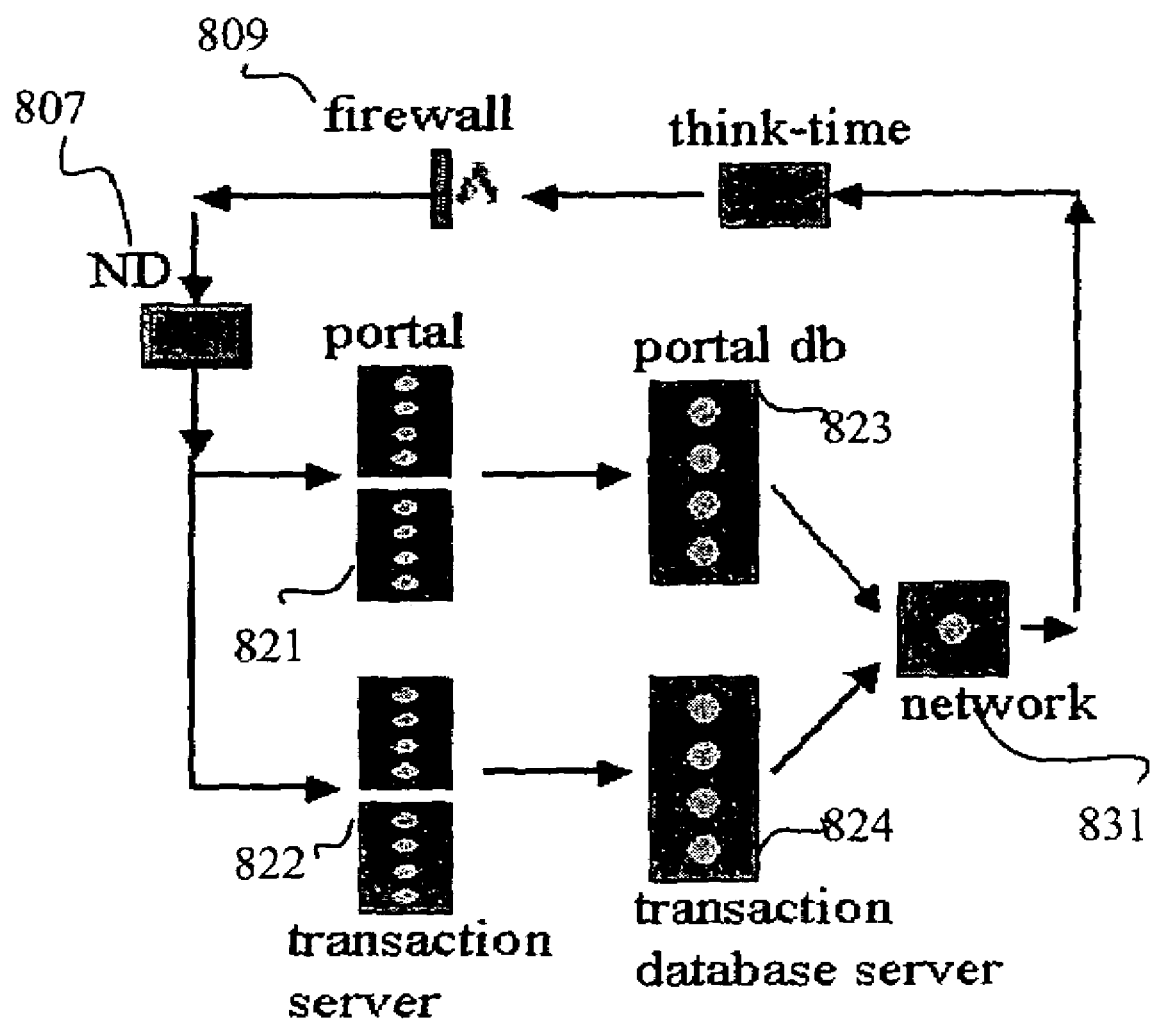
FIG. 8 shows an example of a closed queuing network model.

The system described with reference to FIG. 7 can be modeled as a closed queuing network 800, as shown in FIG. 8. In FIG. 8, network 831 corresponds to Internet 731 in FIG. 7; network dispatcher 807 corresponds to eND 707; firewall 809 corresponds to firewall 709; and servers 821-824 correspond to servers 721-724.

Using the high-level modeling method proposed in the previous section, each server in the Web service architecture may be treated as a service station with a multiple number of generic servers (or CPU's). To capture the multi-threaded processing in the computing environment, it is safe to assume these generic servers are serving jobs according the processor-sharing (PS) discipline.

Since the delays incurred at the firewall 809 and network 831 are also non-negligible, such delay effects are modeled as delay servers. It is also assumed that the firewall 809 and network 831 have constant delays in order to focus on the performance of the Web servers 821-824. In fact, this is often true in an ideal testing environment, where the testing system often resides within the same local network as a "load runner" (or, synthetic-load generator). Another delay center 807 is used to represent user think time (or idle time) between two consecutive transactions.

The system performance is defined with m concurrent user sessions to be the steady-state performance of the closed queuing network under the condition that m users are circulating in the network, each following a sequence of requests again and again. The fraction of resource demand at each layer by each request type may be treated as a decision variable. Note that not all requests require service at the back-end server; from the modeling perspective, this corresponds to a zero service time when such a request goes through the back-end server.

The closed queuing network shown in FIG. 8 is symmetric. This is because all the delay centers (i.e., eND 807, firewall 809, think-time 807, and network 831) can be considered as infinite server centers, while the Web server boxes 721-724 are modeled as PS centers (i.e., under the processor sharing discipline). Therefore, the stationary distribution of this symmetric closed queuing network should have a product form (refer to, F. P. Kelly. *Reversibility and Stochastic Networks*. Wiley, Chichester, 1994; R. W. Wolff. *Stochastic Modeling and the Theory of Queues*. Prentice Hall, 1989). The mean value (MVA) algorithm for product-form networks can then be applied for computing the average delay of the system recursively from the m concurrent users to m+1 concurrent users.

Consider the case when there are m users in the closed queuing system 700. Using the following notations,
I:=number of service stations;
$y_i$: number of times that a user visits station i;
$S_i$:=mean service time of requests at station i;
$\lambda_i(m)$:=arrival rate for requests to station i;
$R_i(m)$:=mean response time of requests at station i;
$L_i(m)$:=average number of requests at station i;
$\rho_i(m)$:=utilization level of service station i;
$T(m)$:=total response time of a single user going through one cycle.

The system throughput then equals $1/T(m)$. The arrival rate for requests and the total response time may be calculated as follows:

$$T(m) = \sum_{i=1}^{I} y_i \cdot R_i(m),$$

$$\lambda_i(m) = m \cdot y_i / T(m),$$

The average number of requests at a station may be computed (based on Little's Law) as follows:

$$L_i(m) = \lambda_i(m) R_i(m), \text{ for } i=0, 1, \ldots, I.$$

The arrival theorem, which is the foundation of the MVT discussed above, states that the number of customers "seen" by a job upon arrival at a station is equal to the mean queue length at the station when the network has one less job. That is, $$R_i(m+1) = S_i \cdot [1 + L_i(m)], i=1, \ldots, I.$$

Therefore, supposing all the service demands $S_i$ are known, by recursively making use of the above equations with the initial conditions $L_i(0)=0$, $i=1, \ldots, I$, the mean values $L_i(m)$, $R_i(m)$ and $T(m)$ may be computed for all $i=1, \ldots, I$ from the m user scenarios to m+1 user scenarios, and so on. The recursive procedure, known as the MVA algorithm, can be summarized as follows:

1. let m=1
2. compute per class system throughput $\lambda_i(m)$
   compute per-class system backlog $L_i(m)$
   apply Little's law to obtain per-class per server response time $R_i(m)$
3. replace m by m+1 and go back to step 2

The general Euclidean distance may be used as the metric for the difference between the measured and predicted end-to-end response times, where the predicted response time is obtained through the above MVA algorithm. The optimization problem (i.e., Equations 615 in FIG. 6) is then used to find the service time parameters such that the distance is minimized. The nonlinear optimization problem is solved using solver 617, as previously described, to obtain the per-class service-time requirements.

While the invention has been described in terms of a single embodiment, those skilled in the art will recognize that the invention can be practiced with modification within the spirit and scope of the appended claims.

Further, it is noted that, Applicants' intent is to encompass equivalents of all claim elements, even if amended later during prosecution.

The invention claimed is:

1. A computer-implemented method for automated performance modeling of an information technology system, comprising:
   receiving system topology data and transaction flow data associated with a distributed data processing system that comprises a plurality of servers which perform a plurality of types of transactions;
   generating a performance model of the distributed data processing system using the system topology and transaction flow data, wherein the performance model characterizes service performance of the distributed data processing system as a function of service demand parameters;
   receiving performance data of the distributed data processing system;
   inferring service demand parameters using the performance data; and
   parameterizing the performance model with a set of service demand parameters that are determined using the inferred service demand parameters.

2. The method of claim 1, wherein the step of receiving performance data comprises receiving end-to-end response times of transactions carried out by the system or response times of transactions at the servers composing the system.

3. The method of claim 1, wherein the step of receiving performance data comprises receiving server load information.

4. The method of claim 1, wherein the step of receiving performance data comprises receiving system throughput measurements.

5. The method of claim 1, wherein the step of receiving transaction flow data comprises receiving at least one modeled queue corresponding to at least one component of the system.

6. The method of claim 1, wherein the step of inferring service demand parameters comprises inferring service times of transactions handled by said servers.

7. The method of claim 1, wherein the step of inferring service demand parameters comprises:
   deriving equations for the performance data;
   solving the equations to find at least one value corresponding to service time for a transaction handled by a server; and
   selecting an optimum value of service time.

8. The method of claim 7, wherein the step of selecting an optimum value comprises:
   computing performance data for the transaction flow model using each of said values;
   comparing the computed performance data with the received performance data; and
   selecting the value of service time corresponding to the computed performance being closest to the measured performance data.

9. The method of claim 1, wherein the step of inferring service demand parameters comprises:
   creating a stochastic model of the system;
   obtaining from the stochastic model at least one value corresponding to service time for a transaction handled by a server; and
   searching for an optimum value of service time.

10. The method of claim 9, wherein the searching step comprises applying a meta-heuristic search to the stochastic model of the system.

11. The method of claim 9, wherein the searching step comprises applying an annealing algorithm to the stochastic model of the system.

12. A computer readable medium comprising computer executable code that when read by a computer causes the computer to perform a method for automated performance modeling of an information technology system, the method comprising:
   receiving system topology data and transaction flow data associated with a distributed data processing system that comprises a plurality of servers which perform a plurality of types of transactions;
   generating a performance model of the distributed data processing system using the system topology and transaction flow data, wherein the performance model characterizes service performance of the distributed data processing system as a function of service demand parameters;
   receiving performance data of the distributed data processing system;
   inferring service demand parameters using the performance data; and
   parameterizing the performance model with a set of service demand parameters that are determined using the inferred service demand parameters.

13. The computer readable medium of claim 12, wherein the step of receiving performance data comprises receiving response times of transactions at the servers or end-to-end response times of the transactions carried out by the system.

14. The computer readable medium of claim 12, wherein the step of receiving performance data comprises receiving server load information.

15. The computer readable medium of claim 12, wherein the step of receiving performance data comprises receiving system throughput measurements.

16. The computer readable medium of claim 12, wherein the step of receiving transaction flow data comprises receiving at least one modeled queue corresponding to at least one component of the system.

17. The computer readable medium of claim 12, wherein the step of inferring service demand parameters comprises inferring service times of transactions handled by said servers.

18. The computer readable medium of claim 12, wherein the step of inferring service demand parameters comprises:
   deriving equations for the performance data;

solving the equations to find at least one value corresponding to service time for a transaction handled by a server; and selecting an optimum value of service time.

19. The computer readable medium of claim 18, wherein the step of selecting an optimum value comprises:

computing performance data for the transaction flow model using each of said values;

comparing the computed performance data with the received performance data; and selecting the value of service time corresponding to the computed performance being closest to the measured performance data.

20. The computer readable medium of claim 12, wherein the step of inferring service demand parameters comprises:

creating a stochastic model of the system;

obtaining from the stochastic model at least one value corresponding to service time for a transaction handled by a server; and searching for an optimum value of service time.

21. The computer readable medium of claim 20, wherein the searching step comprises applying a meta-heuristic search to the stochastic model of the system.

22. The computer readable medium of claim 20, wherein the searching step comprises applying an annealing algorithm to the stochastic model of the system.

* * * * *